(12) United States Patent
Curtis et al.

(10) Patent No.: US 9,419,909 B2
(45) Date of Patent: Aug. 16, 2016

(54) DETERMINING WHEN TO RELEARN A RELATIONSHIP BETWEEN A NETWORK ADDRESS AND A PORT

(71) Applicant: Verizon Patent and Licensing Inc., Basking Ridge, NJ (US)

(72) Inventors: Paul M. Curtis, Sudbury, MA (US); Michael A. Tsukernik, Newton, MA (US); David A. Tassie, Henniker, NH (US); Chitz Shung, Clinton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 333 days.

(21) Appl. No.: 14/154,636

(22) Filed: Jan. 14, 2014

(65) Prior Publication Data
US 2015/0200812 A1    Jul. 16, 2015

(51) Int. Cl.
| | |
|---|---|
| *H04L 12/24* | (2006.01) |
| *G06F 13/36* | (2006.01) |
| *H04L 12/835* | (2013.01) |
| *H04L 12/46* | (2006.01) |

(52) U.S. Cl.
CPC ............. *H04L 47/30* (2013.01); *G06F 13/36* (2013.01); *H04L 12/462* (2013.01)

(58) Field of Classification Search
CPC . H04L 12/462; H04L 47/30; H04L 29/12839; H04L 45/66; H04L 61/2046; H04L 61/6022
See application file for complete search history.

(56) References Cited

U.S. PATENT DOCUMENTS

| | | | |
|---|---|---|---|
| 2009/0238179 A1* | 9/2009 | Samprathi | H04L 12/4625 370/389 |
| 2013/0163596 A1* | 6/2013 | Zhang | H04L 45/74 370/392 |
| 2013/0182722 A1* | 7/2013 | Vishveswaraiah | H04L 12/467 370/475 |

OTHER PUBLICATIONS

Wikipedia, "MAC address", http://en.wikipedia.org/wiki/MAC_address, Jan. 11, 2014, 6 pages.

* cited by examiner

*Primary Examiner* — Awet Haile

(57) ABSTRACT

A device may receive a packet, via a first port, that identifies a source network address. The device may determine a second port, identified in a data structure, that is associated with the source network address. The second port may be different from the first port. The device may determine an age indicator, stored in the data structure, associated with the source network address and the second port. The device may compare the age indicator to a threshold, and may selectively perform a first action or a second action based on comparing the age indicator to the threshold. The first action may include maintaining, in the data structure, a first indication of a first relationship between the source network address and the second port. The second action may include storing, in the data structure, a second indication of a second relationship between the source network address and the first port.

20 Claims, 9 Drawing Sheets

DETERMINING WHEN TO RELEARN A RELATIONSHIP BETWEEN A NETWORK ADDRESS AND A PORT

BACKGROUND

A network address may be used to identify a device on a network. For example, a network address may include a media access control (MAC) address. A MAC address may refer to an identifier assigned to a network interface, of the device, for communications on a physical network link. For example, a MAC address may be used as a network address for an Ethernet interface of the device.

DETAILED DESCRIPTION OF PREFERRED EMBODIMENTS

The following detailed description of example implementations refers to the accompanying drawings. The same reference numbers in different drawings may identify the same or similar elements.

A switching device, such as a switch, a router, a gateway, or the like, may learn and store a relationship between a media access control (MAC) address, that identifies a network device, and a port of the switching device. The switching device may then use this stored relationship to forward packets destined for the MAC address (e.g., the network device) via the related port. The MAC address may later become associated with a different port. This may happen accidentally, such as when a user accidentally assigns the same MAC address to multiple network devices, or purposefully, such as when the MAC address is purposefully reassigned to another network device.

When the MAC address becomes associated with a different port, the switching device may relearn and store the new relationship. However, this relearning consumes computing resources, and may be unnecessary (e.g., such as when the user accidentally assigns the same MAC address to multiple network devices). The consumption of computing resources may be particularly high when the same MAC address is assigned to two different devices, and the switching device repeatedly relearns the relationship when packets with identical source MAC addresses are received from either device. Implementations described herein save computing resources of a switching device by determining when to relearn a relationship between a MAC address and a port.

Figure 1:
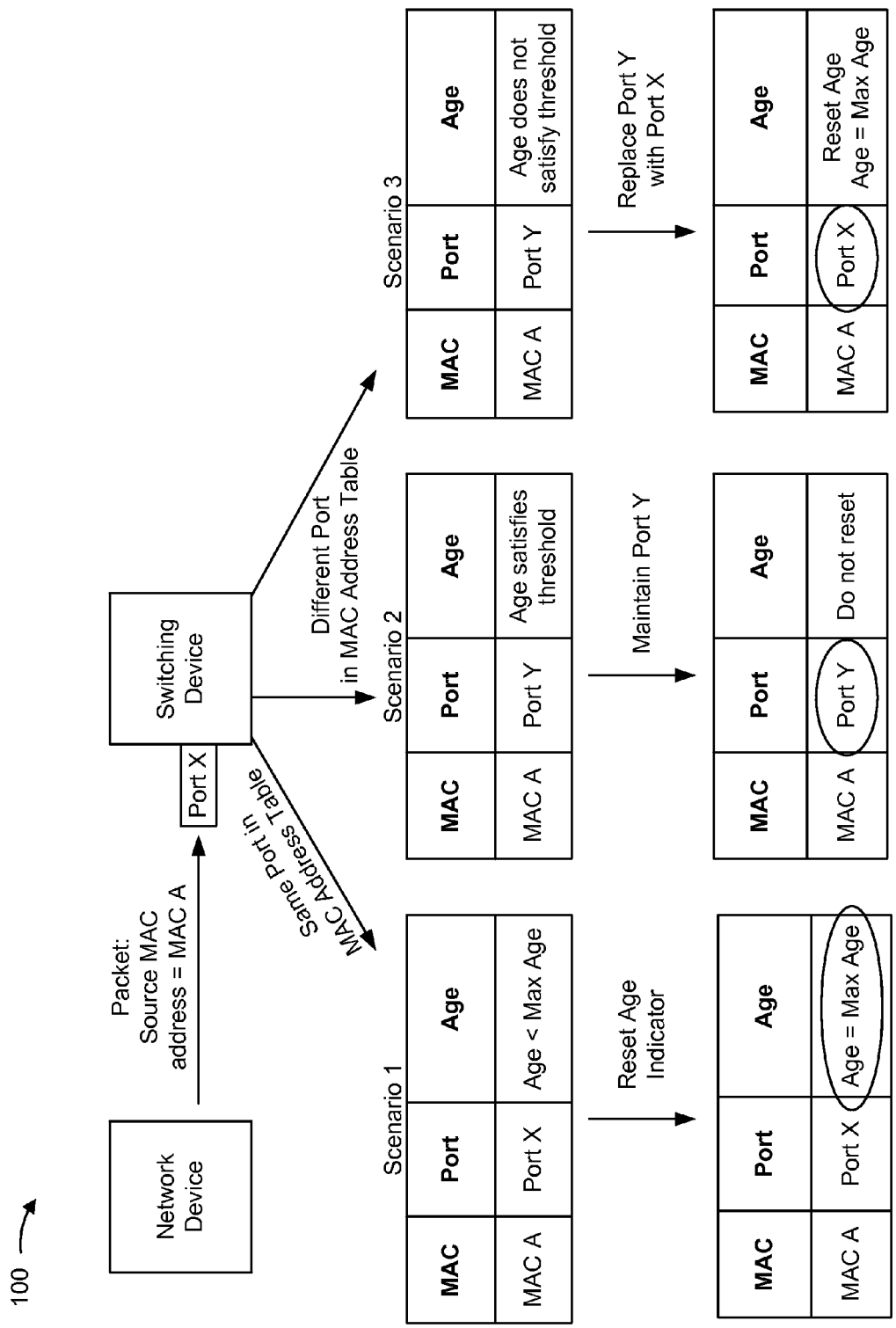
FIG. 1 is a diagram of an overview of an example implementation described herein.

FIG. 1 is a diagram of an overview of an example implementation 100 described herein. As shown in FIG. 1, a switching device may receive, via a port labeled as Port X, a packet from a network device identified using a source MAC address of MAC A. The switching device may use a data structure, such as a MAC address table, to look up the MAC address and identify a port associated with the MAC address. The switching device may use an age indicator to determine whether to maintain a relationship between the port, identified in the MAC address table, and the MAC address.

As shown by Scenario 1, if the port identified in the MAC address table is the same as the port on which the packet was received (e.g., Port X), then the switching device may reset an age indicator associated with the MAC address (e.g., MAC A) and the port (e.g., Port X). By resetting the age indicator, the switching device may create an indication that the relationship between the MAC address and the port is an active relationship.

If the port identified in the MAC address table (e.g., Port Y) is different than the port on which the packet was received (e.g., Port X), then the switching device may determine whether the age indicator satisfies a threshold. As shown by Scenario 2, if the age indicator satisfies the threshold, then the switching device may maintain a relationship between the port identified in the MAC address table (e.g., Port Y) and the MAC address (e.g., MAC A). As shown by Scenario 3, if the age indicator does not satisfy the threshold, then the switching device may update the stored relationship to indicate that the MAC address is no longer associated with the stored port (e.g., Port Y), and is now associated with the port on which the packet was received (e.g., Port X).

In this way, the switching device may conserve computing resources by only updating a relationship between a MAC address and a port when a current relationship is inactive (e.g., when the age indicator indicates that the current relationship is inactive). This may assist the switching device by updating the relationship when a user purposefully associates a MAC address with a different network device, and preventing the relationship from being updated when the user accidentally associates a MAC address with more than one network device (and/or more than one network component of a network device).

Figure 2:
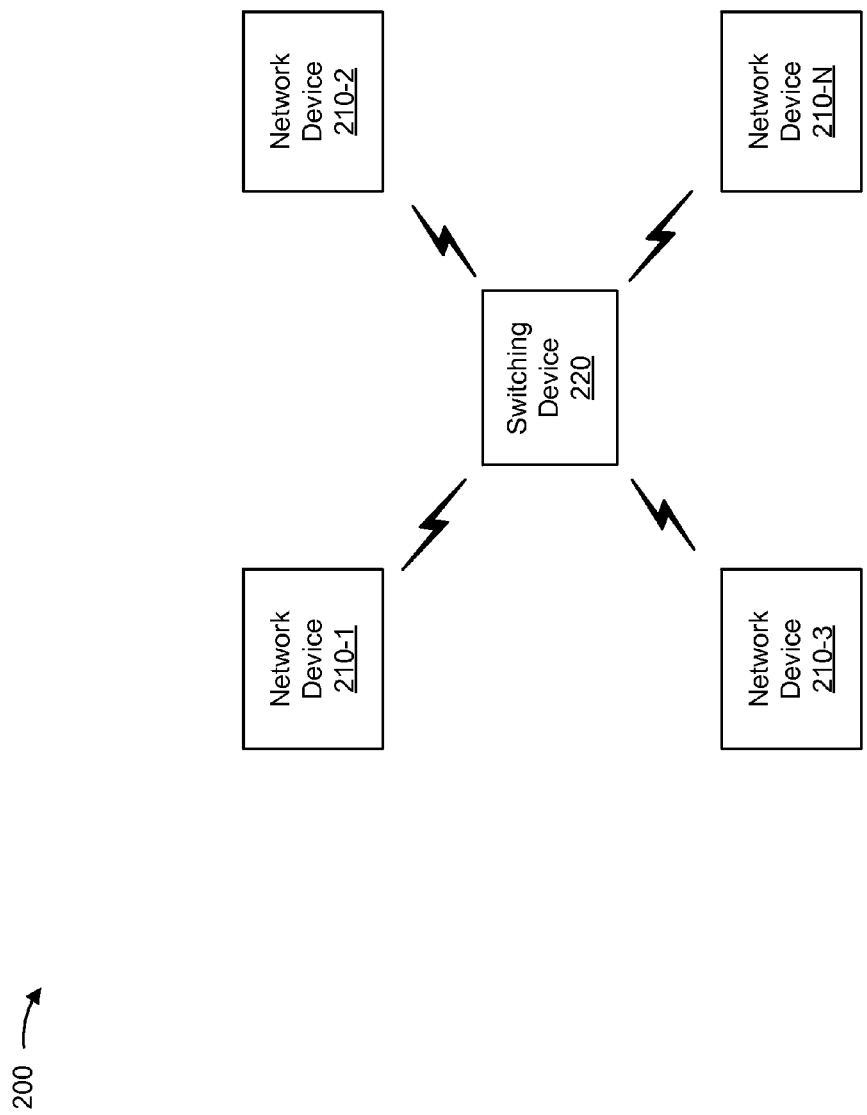
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-N (N≥1) (hereinafter referred to individually as "network device 210" and collectively as "network devices 210") and a switching device 220. Devices of environment 200 may interconnect via wired connections, wireless connections, or a combination of wired and wireless connections. In some implementations, network devices 210 and switching device 220 may be part of a cloud computing environment.

Network device 210 may include one or more devices capable of receiving and/or providing information over a network. For example, network device 210 may include a computing device and/or a traffic transfer device, such as a server, a desktop computer, a laptop computer, a tablet computer, a mobile phone, a router, a bridge, a hub, a switch, a network interface card (NIC), a gateway, a multiplexer, or a similar device. In some implementations, network device 210 may execute a virtual machine. In some implementations, network device 210 may receive information from other devices and/or may transmit information to other devices using switching device 220. Network device 210 may be associated with a network address, such as a MAC address, which may be used to identify network device 210 on a network.

Switching device 220 may include one or more devices capable of transferring (e.g., routing, forwarding, etc.) traffic between devices, such as between network devices 210, between network device 210 and another device (e.g., a client device, a user device, etc.), etc. For example, switching device 220 may include a switch (e.g., a physical switch, a virtual switch, etc.), a router, a bridge, a hub, a firewall, a gateway, a multiplexer, or a similar device. Switching device 220 may receive and/or transmit information via a port (e.g., a physical port, a virtual port). Switching device 220 may store a relationship between a port and a MAC address, and may use the stored relationship to determine a port via which a received packet, that identifies a destination MAC address, is to be transmitted.

The number of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
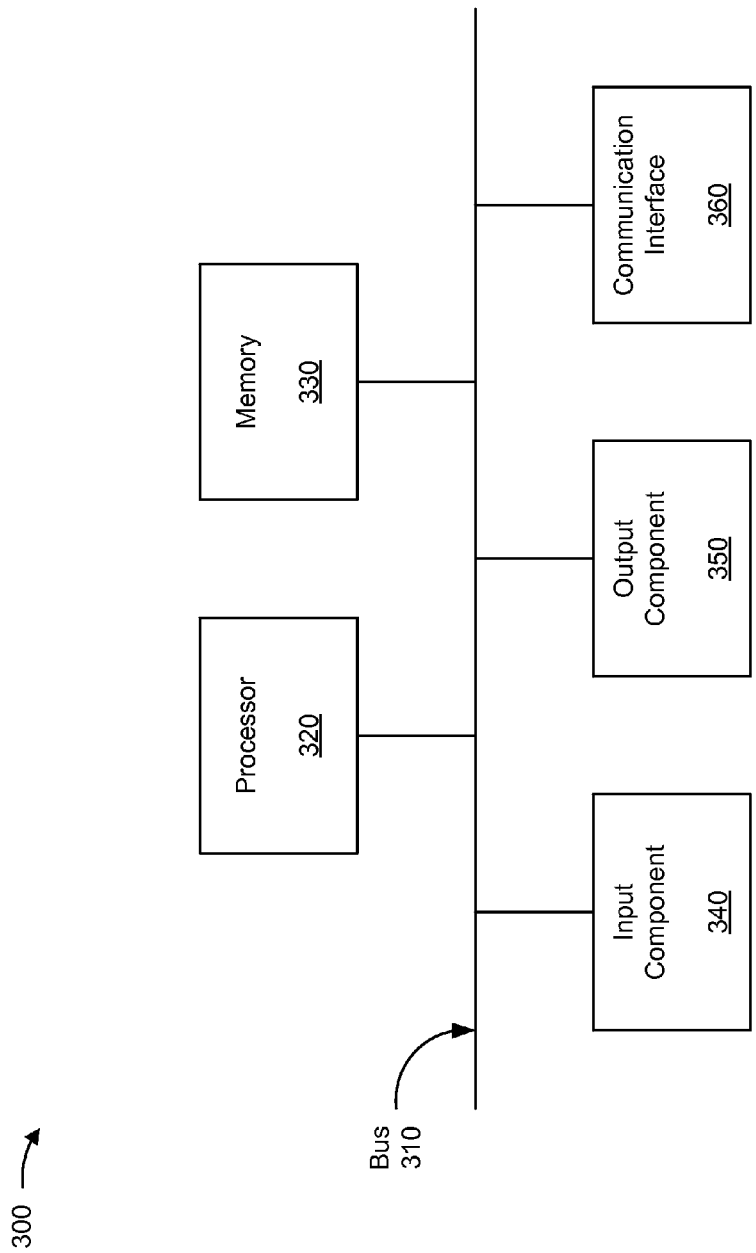
FIG. 3 is a diagram of example components of one or more devices of FIG. 2.

FIG. 3 is a diagram of example components of a device 300. Device 300 may correspond to network device 210 and/or switching device 220. In some implementations, each of network device 210 and/or switching device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like. Communication interface 360 may be identified by a network address, such as a MAC address, in some implementations.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4:
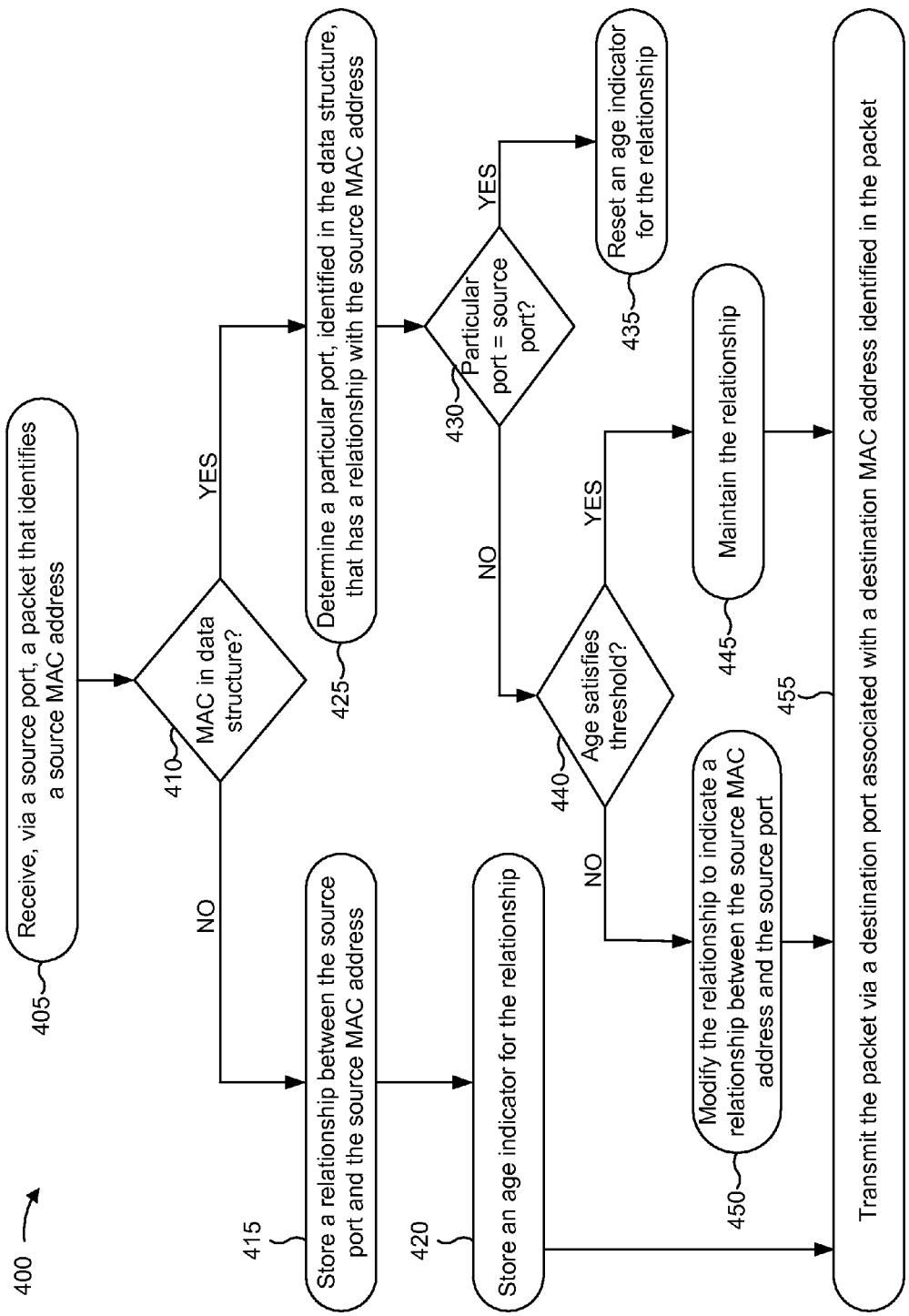
FIG. 4 is a flow chart of an example process for determining when to relearn a relationship between a network address and a port.

FIG. 4 is a flow chart of an example process 400 for determining when to relearn a relationship between a network address and a port. In some implementations, one or more process blocks of FIG. 4 may be performed by switching device 220. Additionally, or alternatively, one or more process blocks of FIG. 4 may be performed by another device or a group of devices separate from or including switching device 220, such as network device 210.

As shown in FIG. 4, process 400 may include receiving, via a source port, a packet that identifies a source MAC address (block 405). For example, switching device 220 may receive a packet, from network device 210, via a source port of switching device 220. The source port may include a physical port or a virtual port. The packet may identify a source MAC address that identifies a device (e.g., a first network device 210) from which the packet was received, and may further identify a destination MAC address that identifies a device (e.g., a second network device 210) for which the packet is destined. For example, switching device 220 may analyze a Layer 2 Ethernet header of the packet to determine the source MAC address associated with the packet, a destination MAC address associated with the packet, a virtual local area network (VLAN) associated with the packet, etc.

While some implementations are described herein in connection with performing particular operations using a MAC address, switching device 220 may perform these operations using another type of network address, such as an Internet Protocol (IP) address, a host address, an address associated with a particular protocol layer, etc.

As further shown in FIG. 4, process 400 may include determining whether the source MAC address is identified in a data structure (block 410). For example, switching device 220 may determine whether the source MAC address is identified in a data structure accessible by switching device 220. The data structure may include, for example, a MAC address table, an age table, a routing table, etc. In some implementations, the data structure or a portion of the data structure may be stored in a specialized memory, such as a ternary content-addressable memory (TCAM). While sometimes described herein as being represented as a table with rows and columns, in practice, the data structure may include any type of data structure, such as a linked list, a tree, a hash table, a database, etc.

In some implementations, the data structure may store relationships between respective MAC addresses and respective ports, on switching device 220, that can be used to communicate with network devices 210 identified by the respective MAC addresses. In some implementations, the data structure may store respective age indicators that indicate an age of respective relationships. Additionally, or alternatively, the data structure (e.g., a MAC address table) may store a pointer, such as a key, that points to a location in another data structure (e.g., an age table) that stores an age indicator for a particular relationship between a MAC address and a port.

Switching device 220 may perform a lookup operation to search the data structure to determine whether the source MAC address is stored in the data structure. Additionally, or alternatively, switching device 220 may determine whether a relationship, between the source MAC address and a port, is identified in the data structure.

If the source MAC address is not identified in the data structure (block 410—NO), then process 400 may include storing a relationship between the source port and the source MAC address (block 415), and storing an age indicator for the relationship (block 420). For example, switching device 220 may determine that the source MAC address is not identified in data structure and/or that a relationship between the source MAC address and a port is not identified in the data structure. In this case, switching device 220 may store, in the data structure, a relationship between the source port and the source MAC address. In this way, switching device 220 may register network device 210 by associating a MAC address, that identifies network device 210, with a port on switching device 220. Thus, when switching device 220 receives a packet destined for the MAC address, switching device 220 may transmit the packet via the port associated with the MAC address.

Additionally, or alternatively, switching device 220 may store an age indicator for the relationship. The age indicator may indicate an amount of time that has elapsed since switching device 220 received a packet, via the source port, that identifies the source MAC address. In some implementations, the age indicator may include a counter. Switching device 220 may set the counter to an initial value, and may increment or decrement the counter toward a terminal value. For example, the counter may begin at zero, and may be incremented (e.g., at a particular time interval) until the counter reaches, for example, a value of one hundred. As another example, the counter may begin at a value of one hundred, and may be decremented (e.g., at a particular time interval) until the counter reaches a value of zero.

When the counter reaches a terminal value (e.g., when the age indicator satisfies a threshold and/or indicates that a threshold amount of time has elapsed), then switching device 220 may delete the stored relationship between the source port and the MAC address. In this way, switching device 220 may remove stale relationships from the data structure. Furthermore, switching device 220 may use the age indicator to determine whether to relearn a relationship between the MAC address and an associated port, as further described elsewhere herein.

If the source MAC address is identified in the data structure (block 410—YES), then process 400 may include determining a particular port, identified in the data structure, that has a relationship with the source MAC address (block 425), and determining whether the particular port is the same as the source port (block 430). For example, switching device 220 may determine that the data structure stores a relationship between the source MAC address and a particular port, identified in the data structure. In some implementations, the data structure may include an entry for the source MAC address, and the entry may be included in a row that identifies the particular port as having a relationship with the source MAC address. For example, switching device 220 may perform the operations described herein in connection with process blocks 415 and 420, which may cause the relationship between the source MAC address and the particular port to be stored in the data structure. Switching device 220 may determine whether the particular port is the same as the source port via which the packet was received.

If the particular port is the same as the source port (block 430—YES), then process 400 may include resetting an age indicator for the relationship between the source MAC address and the particular port (block 435). For example, if switching device 220 determines that the particular port is the same as the source port, then switching device 220 may reset an age indicator associated with the particular port and the source MAC address. Switching device 220 may reset the age indicator to an initial value, such as a maximum value or a minimum value. In this way, switching device 220 may set the age indicator to a value that indicates an amount of time that has elapsed since switching device 220 received a packet, that identifies the source MAC address, via the source port (e.g., which is the same as the particular port in this case).

If the particular port is not the same as the source port (block 430—NO), then process 400 may include determining whether the age indicator satisfies a threshold (block 440). For example, switching device 220 may compare the age indicator to a threshold value. The threshold value may be the initial value, in some implementations. Alternatively, the threshold value may be a value that is between the initial value and the terminal value. Switching device 220 may determine whether the age indicator is less than the threshold value, is greater than the threshold value, is equal to the threshold value, is less than or equal to the threshold value, is greater than or equal to the threshold value, etc.

If the age indicator satisfies the threshold (block 440—YES), then process 400 may include maintaining the relationship between the source MAC address and the particular port (block 445). For example, switching device 220 may determine that the age indicator satisfies the threshold. When the age indicator satisfies the threshold, switching device 220 may determine that a relationship between the source MAC address and the particular port is active. In this case, switching device 220 may maintain a stored relationship between the source MAC address and the particular port. In other words, switching device 220 may prevent information that identifies the source port, identified in the received packet, from being stored in the data structure. In this way, switching device 220 may preserve an active relationship between a MAC address and a particular port stored in the data structure (e.g., where the age indicator indicates that the relationship is active). In some implementations, switching device 220 may generate and/or provide an error message (e.g., may provide an error message to network device 210 identified by the source MAC address included in the received packet).

Additionally, or alternatively, switching device 220 may prevent the age indicator from being reset when the age indicator satisfies the threshold. In other words, switching device 220 may prevent a counter (e.g., represented using the age indicator) from being set to an initial value. In this way, the counter may continue to indicate an amount of time that has elapsed since switching device 220 received a packet, that identifies the source MAC address, via the particular port (e.g., because in this case, switching device 220 has received a packet that identifies the source port rather than the particular port).

If the age indicator does not satisfy the threshold (block 440—NO), then process 400 may include modifying the relationship, between the source MAC address and the particular port, to indicate a relationship between the source MAC address and the source port (block 450). For example, switching device 220 may determine that the age indicator does not satisfy the threshold. When the age indicator does not satisfy the threshold, switching device 220 may determine that a relationship between the source MAC address and the particular port is inactive. In this case, switching device 220 may delete, from the data structure, an indication of the relationship between the source MAC address and the particular port.

Additionally, or alternatively, switching device 220, may store, in the data structure, an indication of a relationship between the source MAC address and the source port identified in the received packet. In other words, switching device 220 may replace the particular port (e.g., a particular port identifier) with the source port (e.g., a source port identifier) in the data structure. In this way, switching device 220 may remove an inactive relationship between a MAC address and a port (e.g., where the age indicator indicates that the relationship is inactive), and may replace the inactive relationship with an active relationship.

In some implementations, switching device 220 may delete an age indicator, associated with the particular port, when the age indicator does not satisfy the threshold. Additionally, or alternatively, switching device 220 may store and/or reset an age indicator associated with the source port. In this way, the age indicator may indicate an amount of time that has elapsed since switching device 220 received a packet, that identifies the source MAC address, via the source port (e.g., because in this case, switching device 220 has received a packet that identifies the source port rather than the particular port).

Switching device 220 may use multiple thresholds to manage stored relationships, in some implementations. For example, assume that switching device 220 sets the age indicator to an initial value of zero, and increments the age indicator by a value of one every second until the age indicator reaches a terminal value of one hundred. In this case, switching device 220 may use a first threshold (e.g., one hundred) to determine whether to delete, from the data structure, information that identifies a MAC address and/or information associated with the MAC address. For example, switching device 220 may delete information that identifies the MAC address when the age indicator is equal to one hundred. Switching device 220 may use a second threshold (e.g., zero) to determine whether to maintain or modify a stored relationship. For example, switching device 220 may maintain a stored relationship when the age indicator is equal to zero, and may modify the stored relationship when the age indicator is greater than zero. Alternatively, switching device 220 may set the second threshold to a value between zero and one hundred (e.g., between the initial value and the terminal value). In some implementations, switching device 220 may set the first threshold and/or the second threshold based on user input.

As further shown in FIG. 4, process 400 may include transmitting the packet via a destination port associated with a destination MAC address identified in the packet (block 455). For example, after updating and/or maintaining the data structure, switching device 220 may determine a destination MAC address identified in the packet. Switching device 220 may use the data structure to identify a port, associated with the destination MAC address, via which the packet is to be transmitted. Switching device 220 may transmit the packet via the identified port, which may cause the packet to be transmitted to network device 210 identified by the destination MAC address.

In this way, switching device 220 may determine an age of a relationship between a MAC address and a port, and may use the age to determine whether to maintain, update, and/or remove the relationship. By managing relationships in this manner, switching device 220 may prevent relationships from being modified unnecessarily, thus saving computing resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of determining when to relearn a relationship between a MAC address and a port.

Figure 5A:
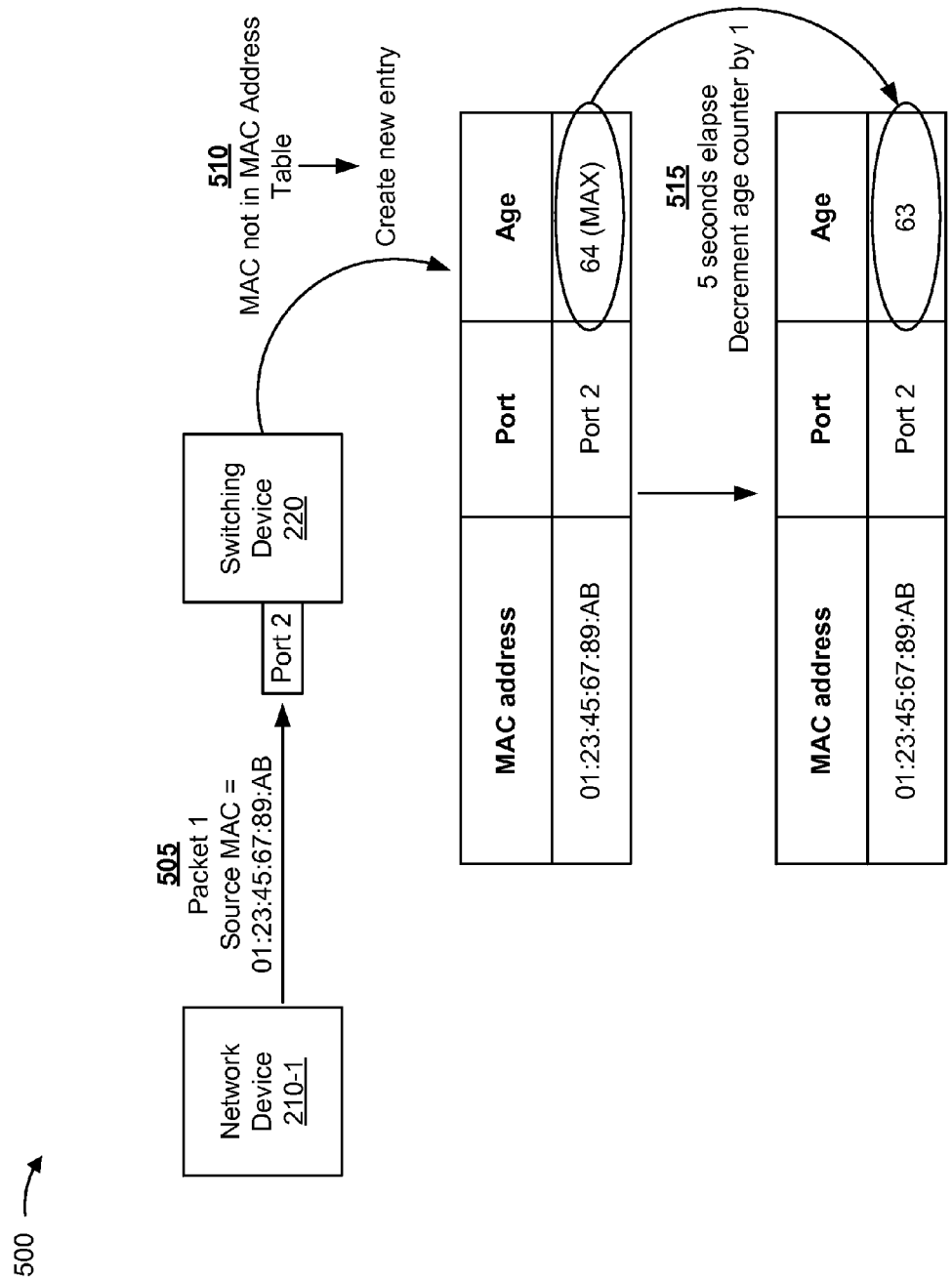
FIGS. 5A-5E are diagrams of an example implementation relating to the example process shown in FIG. 4.

As shown in FIG. 5A, and by reference number 505, assume that network device 210-1 transmits a packet, shown as Packet 1, that identifies a source MAC address of 01:23:45:67:89:AB for network device 210-1. Further, assume that switching device 220 receives the packet on a port shown as Port 2. As shown by reference number 510, assume that the source MAC address is not stored in a MAC address table, and that switching device 220 creates a new entry in the MAC address table (and/or an age table associated with the MAC address table) to indicate a relationship between the source MAC address (e.g., 01:23:45:67:89:AB) and the port (e.g., Port 2). Furthermore, assume that switching device 220 stores an age indicator that indicates an age of the relationship.

As further shown in FIG. 5A, the MAC address table identifies the source MAC address of 01:23:45:67:89:AB and the port on which Packet 1 was received, Port 2. The source MAC address and a port identifier are included in the same row of the MAC address table to indicate a relationship between the source MAC address and the port. Furthermore, the MAC address table (and/or an age table associated with the MAC address table) includes an age indicator that indicates an age of the relationship (e.g., indicates an amount of time that has elapsed since switching device 220 received a packet, on Port 2, with a source MAC address of 01:23:45:67:89:AB). For the purpose of example implementation 500, assume that the age indicator has a maximum initial value of sixty-four, and that switching device 220 decrements the value of the age indicator by one every five seconds. For example, as shown by reference number 515, assume that five seconds elapse, and that switching device 220 decrements the age indicator by one, resulting in a value of sixty-three.

Figure 5B:
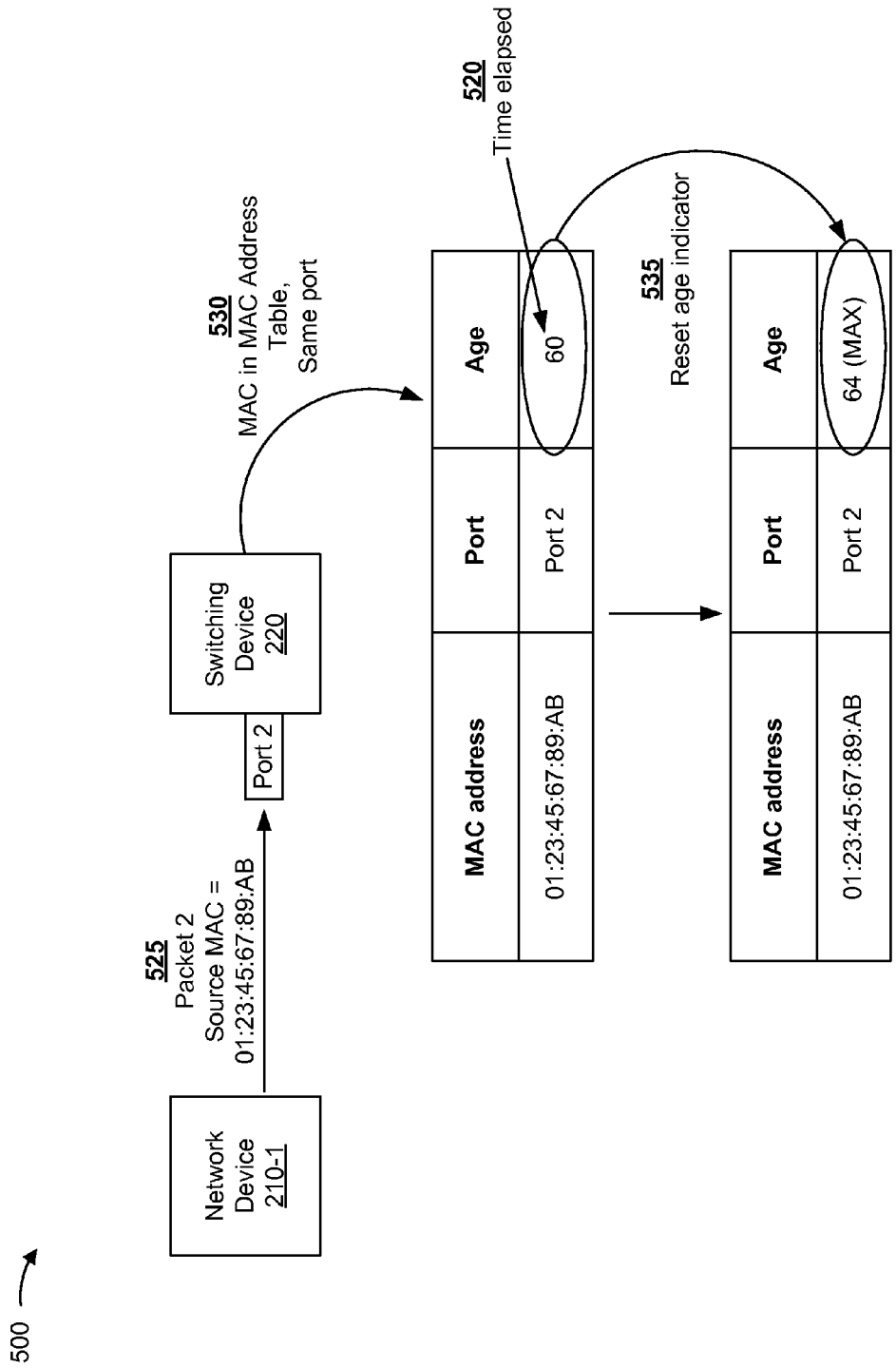

As shown in FIG. 5B, and by reference number 520, assume that fifteen additional seconds pass, and that switching device 220 has decremented the value of the age indicator to a value of sixty. As shown by reference number 525, assume that at this point in time, switching device 220 receives Packet 2 from network device 210-1. Further, assume that Packet 2 identifies the same source MAC address as Packet 1 (01:23:45:67:89:AB), and that switching device 220 receives Packet 2 on the same port as Packet 1 (Port 2). As shown by reference number 530, switching device 220 determines that the source MAC address is already stored in the MAC address table, and that the MAC address table indicates a relationship between the source MAC address and Port 2. Based on this determination, switching device 220 resets the value of the age indicator to sixty-four, as shown by reference number 535. In this way, switching device 220 stores an indication that the relationship between source MAC address 01:23:45:67:89:AB and Port 2 is an active relationship.

Figure 5C:
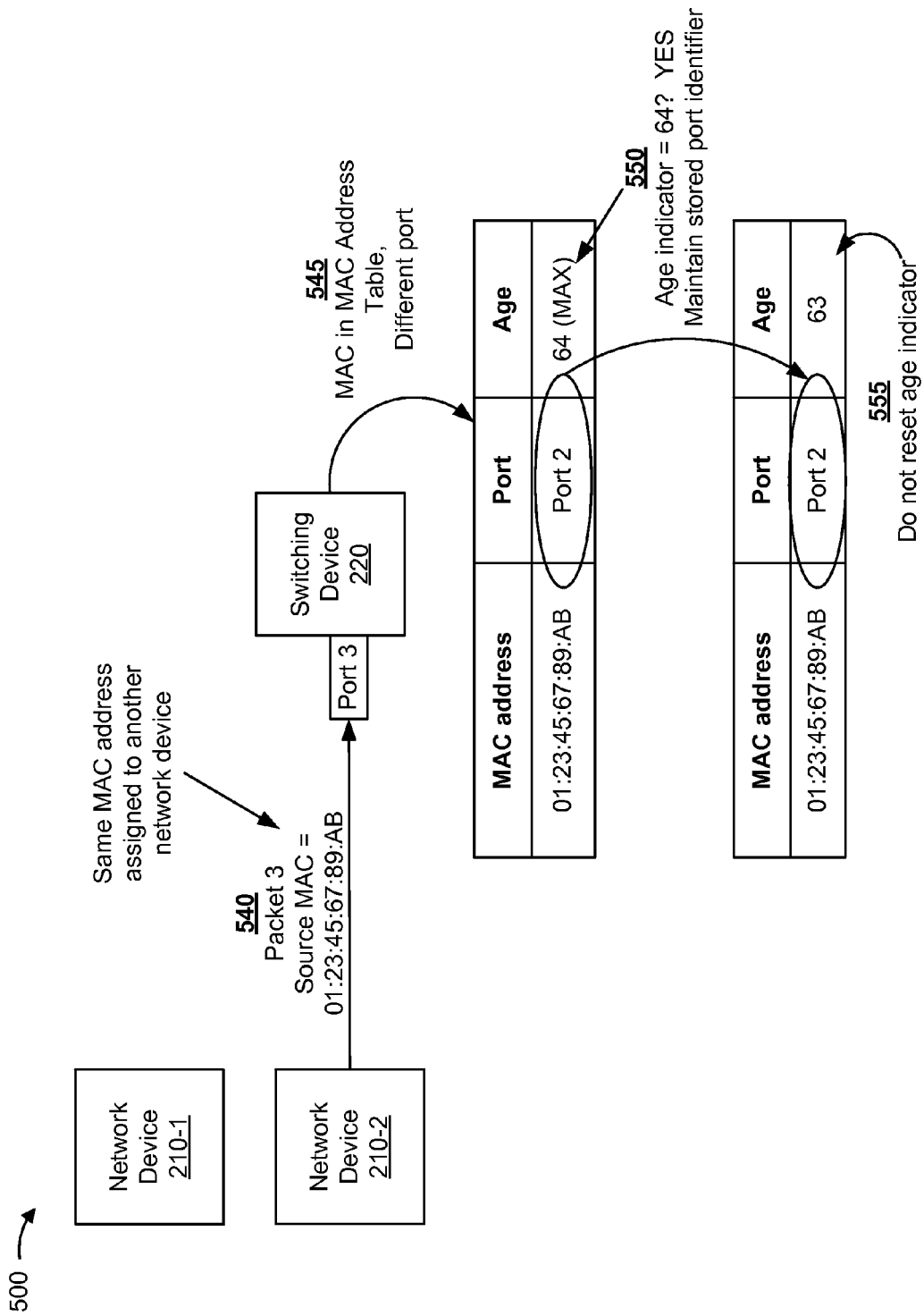

As shown in FIG. 5C, and by reference number 540, assume that a different network device 210-2 transmits a packet, shown as Packet 3, that identifies the same source MAC address of 01:23:45:67:89:AB for network device 210-2. For example, assume that a user associated with network device 210-1 and network device 210-2 accidentally assigns the same MAC address to both network device 210-1 and network device 210-2. As shown, assume that switching device 220 receives Packet 3 on Port 3. As shown by reference number 545, switching device 220 determines that the source MAC address is already stored in the MAC address table, and that the MAC address table indicates a relationship between the source MAC address and a different port (Port 2) than the port via which Packet 3 was received (Port 3). Based on determining that the MAC address table identifies a different port, switching device 220 compares the value of the age indicator to a threshold.

As shown by reference number 550, assume that switching device 220 determines whether the age indicator value is equal to sixty-four. Switching device 220 determines that the age indicator value is equal to sixty-four, and thus maintains the port identifier stored in the MAC address table (Port 2). Furthermore, as shown by reference number 555, assume that switching device 220 does not reset the age indicator. For example, assume that three seconds elapsed before Packet 3 was received, and that two more seconds elapsed after Packet 3 was received. Since five seconds have elapsed since switching device 220 received a packet, identifying the same MAC address, via Port 2, switching device 220 decrements the age indicator to a value of sixty-three. In this way, switching device 220 may prevent a new relationship from being relearned and stored when a current relationship is still active (e.g., indicating that the same source MAC address may have been accidentally assigned to multiple network devices 210).

Figure 5D:
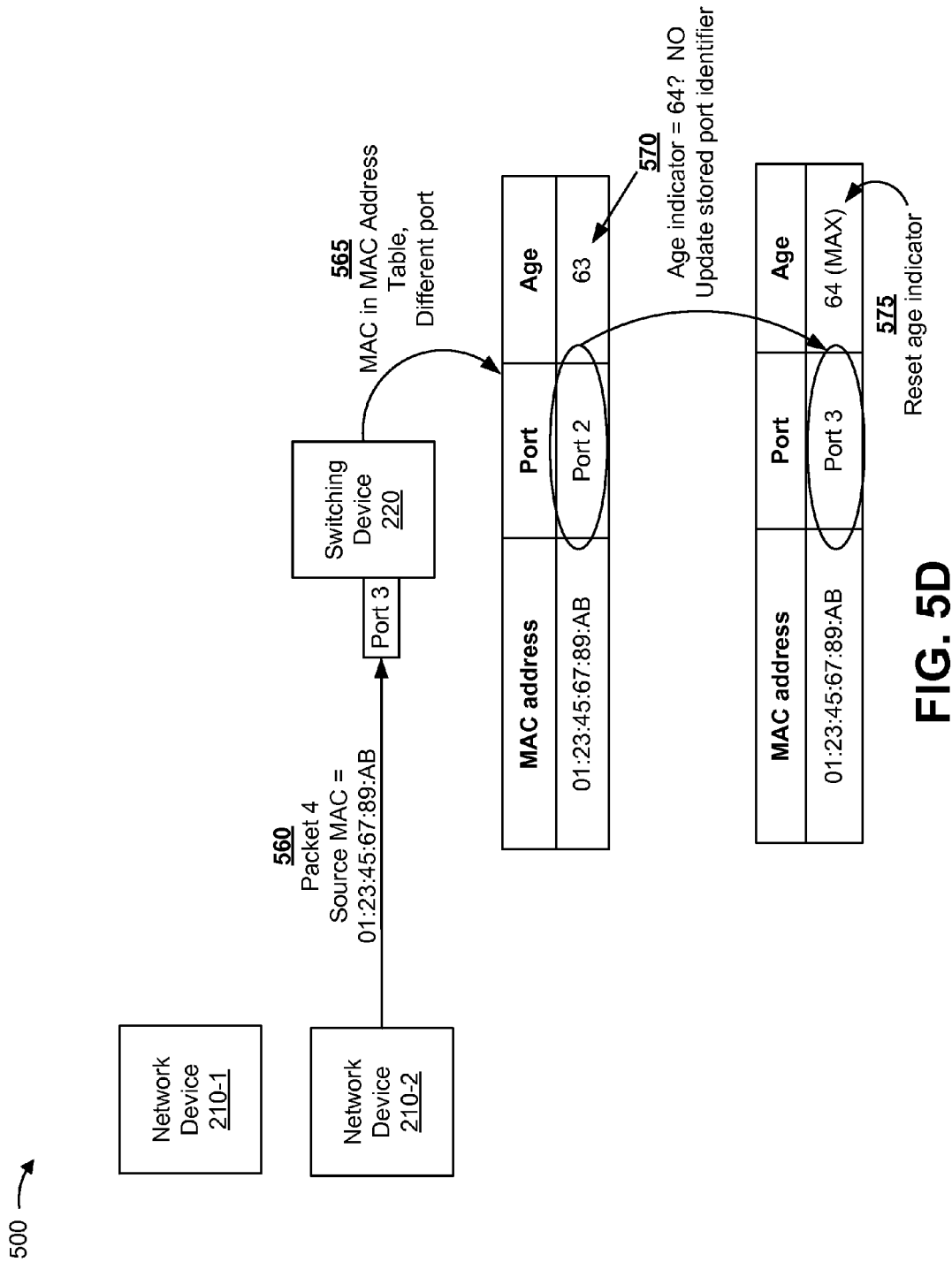

As shown in FIG. 5D, and by reference number 560, assume that network device 210-2 transmits another packet, shown as Packet 4, that identifies the same source MAC address of 01:23:45:67:89:AB for network device 210-2. As shown, assume that switching device 220 receives Packet 4 on Port 3. As shown by reference number 565, switching device 220 determines that the source MAC address is already stored in the MAC address table, and that the MAC address table indicates a relationship between the source MAC address and a different port (Port 2) than the port via which Packet 3 was received (Port 3). Based on determining that the MAC address table identifies a different port, switching device 220 compares the value of the age indicator to a threshold.

As shown by reference number 570, assume that switching device 220 determines whether the age indicator value is equal to sixty-four. Switching device 220 determines that the age indicator value is not equal to sixty-four (e.g., is equal to sixty-three), and thus updates the port identifier stored in the MAC address table from Port 2 to Port 3. Furthermore, as shown by reference number 575, assume that switching device 220 resets the age indicator for the new relationship. In this way, switching device 220 may relearn and/or store a new relationship when a current relationship is inactive (e.g., indicating that the source MAC address may have been purposefully reassigned to a different network device 210).

Figure 5E:
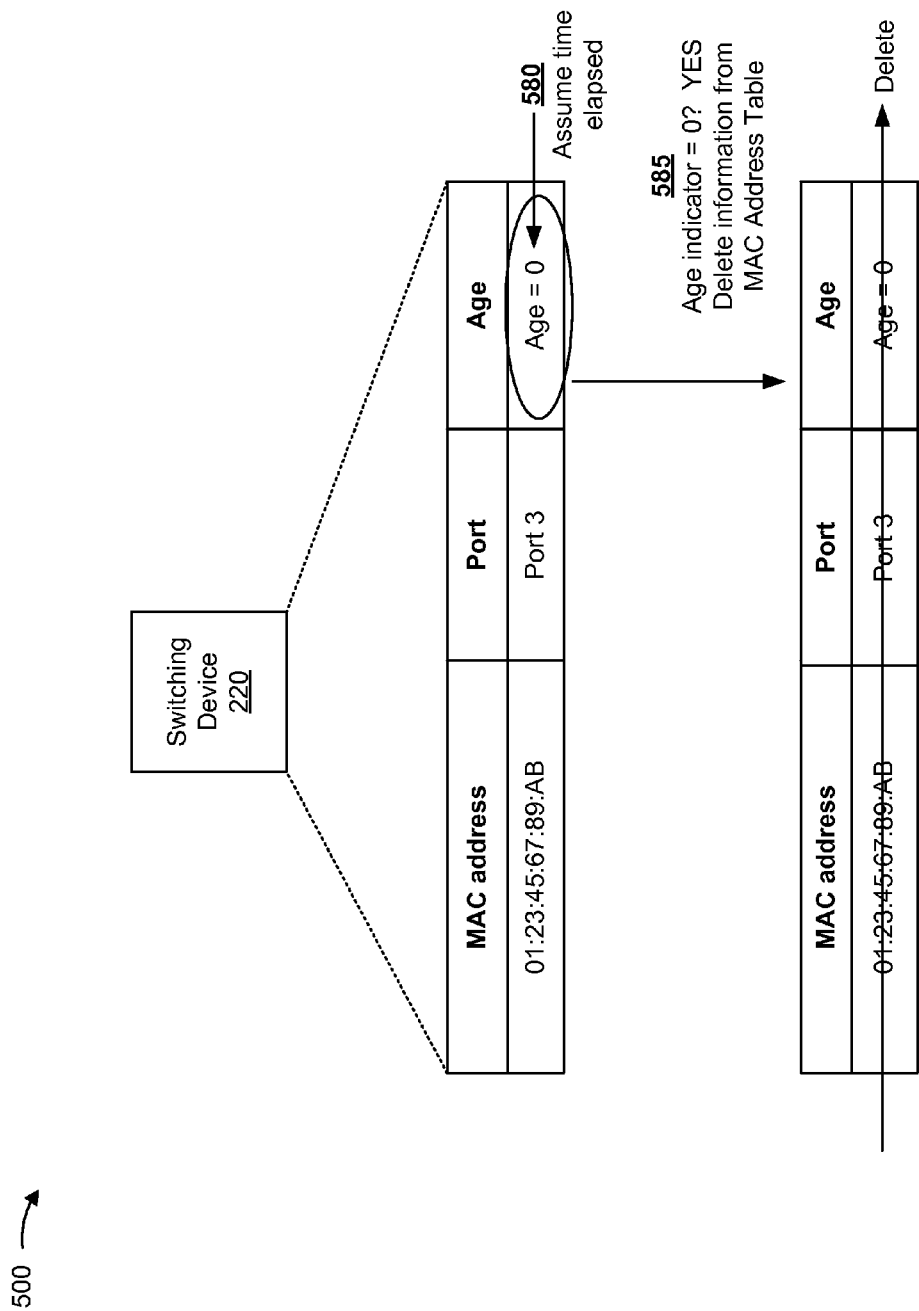

As shown in FIG. 5E, and by reference number 580, assume that a particular amount of time has elapsed such that switching device 220 has decremented the age indicator value to zero. In this case, switching device 220 deletes the information stored in the MAC address table. In this way, switching device 220 may remove stale relationships from memory.

As indicated above, FIGS. 5A-5E are provided merely as an example. Other examples are possible and may differ from what was described with regard to FIGS. 5A-5E.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, a packet may refer to a packet, a frame, a datagram, a fragment of a packet, a fragment of a frame, a fragment of a datagram, or any other unit of information (e.g., encapsulated information) that may be used to carry information at a particular communication layer.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive an incoming packet, via a first port, that identifies a source media access control (MAC) address;
determine a second port, identified in a data structure accessible by the device, that is associated with the source MAC address;
determine that the first port and the second port are different ports;
determine an age indicator associated with the source MAC address and the second port based on determining that the first port and the second port are different ports,
the age indicator being a counter indicating an amount of time that has elapsed since a packet was received, via the second port, that identifies the source MAC address; and
selectively perform a first action or a second action based on the age indicator,
the first action including maintaining, in the data structure, a first indication of a first relationship between the source MAC address and the second port, and
the second action including storing, in the data structure, a second indication of a second relationship between the source MAC address and the first port.

2. The device of claim 1, where the age indicator is a first age indicator; and
   where the one or more processors, when selectively performing the second action, are to:
      modify the first indication of the first relationship into the second indication of the second relationship; and
      store, in the data structure, a second age indicator associated with the source MAC address and the first port,
         the second age indicator indicating an amount of time that has elapsed since the incoming packet was received via the first port.

3. The device of claim 1, where the one or more processors, when selectively performing the first action, are to:
   prevent the age indicator from being reset to an initial value,
      the age indicator being associated with the first relationship.

4. The device of claim 1, where the age indicator is a first age indicator,
   the first age indicator being associated with the first relationship; and
   where the one or more processors, when selectively performing the second action, are to:
      remove the first age indicator from the data structure;
      set a second age indicator to an initial value,
         the second age indicator being associated with the second relationship; and
      store the second age indicator in the data structure.

5. The device of claim 1, where the one or more processors, when selectively performing the first action or the second action based on the age indicator, are to:
   compare the age indicator to a threshold value; and
   selectively perform the first action or the second action based on comparing the age indicator to the threshold value,
      the first action being performed based on the age indicator satisfying the threshold value; and
      the second action being performed based on the age indicator not satisfying the threshold value.

6. The device of claim 1, where the one or more processors, when selectively performing the second action, are to:
   remove, from the data structure, the first indication of the first relationship between the source MAC address and the second port.

7. The device of claim 1, where the incoming packet is a first packet; and
   where the one or more processors are further to:
      receive a second packet that identifies a destination MAC address that corresponds to the source MAC address;
      determine whether the first indication or the second indication is stored in the data structure based on receiving the second packet; and
      transmit, via the first port or the second port, the second packet,
         the second packet being transmitted via the first port based on the second indication being stored in the data structure, and
         the second packet being transmitted via the second port based on the first indication being stored in the data structure.

8. A computer-readable medium storing instructions, the instructions comprising:
   one or more instructions that, when executed by one or more processors of a device, cause the one or more processors to:
      receive an incoming packet, via a first port, that identifies a source network address;
      determine a second port, identified in a data structure, that is associated with the source network address,
         the second port being different from the first port;
      determine an age indicator, stored in the data structure, associated with the source network address and the second port,
         the age indicator including a counter that indicates an amount of time that has elapsed since a packet was received, via the second port, that identifies the source network address;
      compare the age indicator to a threshold; and
      selectively perform a first action or a second action based on comparing the age indicator to the threshold,
         the first action including maintaining, in the data structure, a first indication of a first relationship between the source network address and the second port,
            the first indication being stored in the data structure, and
         the second action including storing, in the data structure, a second indication of a second relationship between the source network address and the first port.

9. The computer-readable medium of claim 8, where the age indicator is a first age indicator; and
   where the one or more instructions, when selectively performing the second action, cause the one or more processors to:
      modify, in the data structure, the first indication of the first relationship into the second indication of the second relationship; and
      store, in the data structure, a second age indicator associated with the source network address and the first port,
         the second age indicator indicating an amount of time that has elapsed since the incoming packet was received via the first port.

10. The computer-readable medium of claim 8,
    where the one or more instructions, when selectively performing the first action, cause the one or more processors to:
       prevent the age indicator from resetting to an initial value.

11. The computer-readable medium of claim 8, where the age indicator is a first age indicator associated with the first relationship between the source network address and the second port; and
    where the one or more instructions, when selectively performing the second action, cause the one or more processors to:
       remove the first age indicator from the data structure;
       set a second age indicator to an initial value,
          the second age indicator being associated with the second relationship between the source network address and the first port; and
       store the second age indicator in the data structure.

12. The computer-readable medium of claim 8, where the one or more instructions, when selectively performing the second action, cause the one or more processors to:
    remove, from the data structure, the first indication of the first relationship between the source network address and the second port.

13. The computer-readable medium of claim 8, where the source network address includes a source media access control (MAC) address that identifies a network device from which the incoming packet was received.

14. A method, comprising:
 receiving, by a device and via a first port of the device, an incoming packet that identifies a source network address;
 determining, by the device, a second port, identified in a data structure accessible by the device, that has a first relationship with the source network address;
 determining, by the device, that the first port and the second port are different ports;
 identifying, by the device and using the data structure, an age indicator associated with the source network address and the second port based on determining that the first port and the second port are different ports,
  the age indicator indicating an amount of time that has elapsed since a packet was received, via the second port, that identifies the source network address; and
 selectively performing, by the device, a first action or a second action based on the age indicator,
  the first action including maintaining, in the data structure, information that identifies the first relationship between the source network address and the second port, and
  the second action including storing, in the data structure, information that identifies a second relationship between the source network address and the first port.

15. The method of claim 14,
 where selectively performing the second action comprises:
  modifying, in the data structure, the information identifying the first relationship into the information identifying the second relationship.

16. The method of claim 14, where selectively performing the first action comprises:
 preventing the age indicator from resetting to an initial value,
  the age indicator being associated with the first relationship.

17. The method of claim 14, where the age indicator is a first age indicator,
 the first age indicator being associated with the first relationship; and
 where selectively performing the second action comprises:
  removing the first age indicator from the data structure;
  setting a second age indicator to an initial value,
   the second age indicator being associated with the second relationship; and
  storing the second age indicator in the data structure.

18. The method of claim 14, where selectively performing the first action or the second action comprises:
 comparing the age indicator to a threshold value; and
 selectively performing the first action or the second action based on comparing the age indicator to the threshold value,
  the first action being performed based on the age indicator satisfying the threshold value; and
  the second action being performed based on the age indicator not satisfying the threshold value.

19. The method of claim 14, where the age indicator is a first age indicator; and
 where selectively performing the second action comprises:
  removing, from the data structure, the information that identifies the first relationship between the source network address and the second port; and
  storing, in the data structure, a second age indicator associated with the source network address and the first port,
   the second age indicator indicating an amount of time that has elapsed since the incoming packet was received via the first port.

20. The method of claim 14, where the source network address includes a source media access control (MAC) address that identifies a network device from which the incoming packet was received.

* * * * *